(12) United States Patent
Maier et al.

(10) Patent No.: US 9,827,934 B2
(45) Date of Patent: Nov. 28, 2017

(54) RADIATOR GRILLE FOR A MOTOR VEHICLE

(71) Applicant: Daimler AG, Stuttgart (DE)

(72) Inventors: Hans-Peter Maier, Nagold (DE); Jochen Roesch, Boeblingen (DE); Achim Koehler, Leonberg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/382,087

(22) PCT Filed: Jan. 23, 2013

(86) PCT No.: PCT/EP2013/000201
§ 371 (c)(1),
(2) Date: Aug. 29, 2014

(87) PCT Pub. No.: WO2013/127483
PCT Pub. Date: Sep. 6, 2013

(65) Prior Publication Data
US 2015/0028605 A1    Jan. 29, 2015

(30) Foreign Application Priority Data

Mar. 2, 2012 (DE) .......... 10 2012 004 041
Jul. 10, 2012 (DE) .......... 10 2012 013 699

(51) Int. Cl.
*B60R 19/54* (2006.01)
*B60K 11/04* (2006.01)
*B60R 19/52* (2006.01)

(52) U.S. Cl.
CPC .............. *B60R 19/52* (2013.01); *B60K 11/04* (2013.01); *B60R 2019/525* (2013.01)

(58) Field of Classification Search
CPC .... B60R 19/52; B60R 2019/525; B60K 11/04
See application file for complete search history.

(56) References Cited

U.S. PATENT DOCUMENTS

| 1,715,762 | A | 6/1929 | Kerbs |
| 2,165,648 | A | 7/1939 | Oswald |
| 7,641,267 | B2 * | 1/2010 | Makino ................... B60Q 5/00 296/193.09 |
| 8,038,204 | B1 | 10/2011 | Baker |

(Continued)

FOREIGN PATENT DOCUMENTS

| CN | 1403315 A | 3/2003 |
| CN | 1590161 A | 3/2005 |

(Continued)

OTHER PUBLICATIONS

Corresponding International Search Report dated Sep. 19, 2013 with English Translation (seven (7) pages).

(Continued)

*Primary Examiner* — Glenn Dayoan
*Assistant Examiner* — Melissa A Black
(74) *Attorney, Agent, or Firm* — Crowell & Moring LLP

(57) ABSTRACT

An ornamental grille arranged for attachment to a peripheral frame of a motor vehicle radiator grille includes a grille structure having respective grille elements. Domes are formed on points of intersection of the grille elements of the grille structure.

12 Claims, 4 Drawing Sheets

(56) References Cited

U.S. PATENT DOCUMENTS

Figure 4:
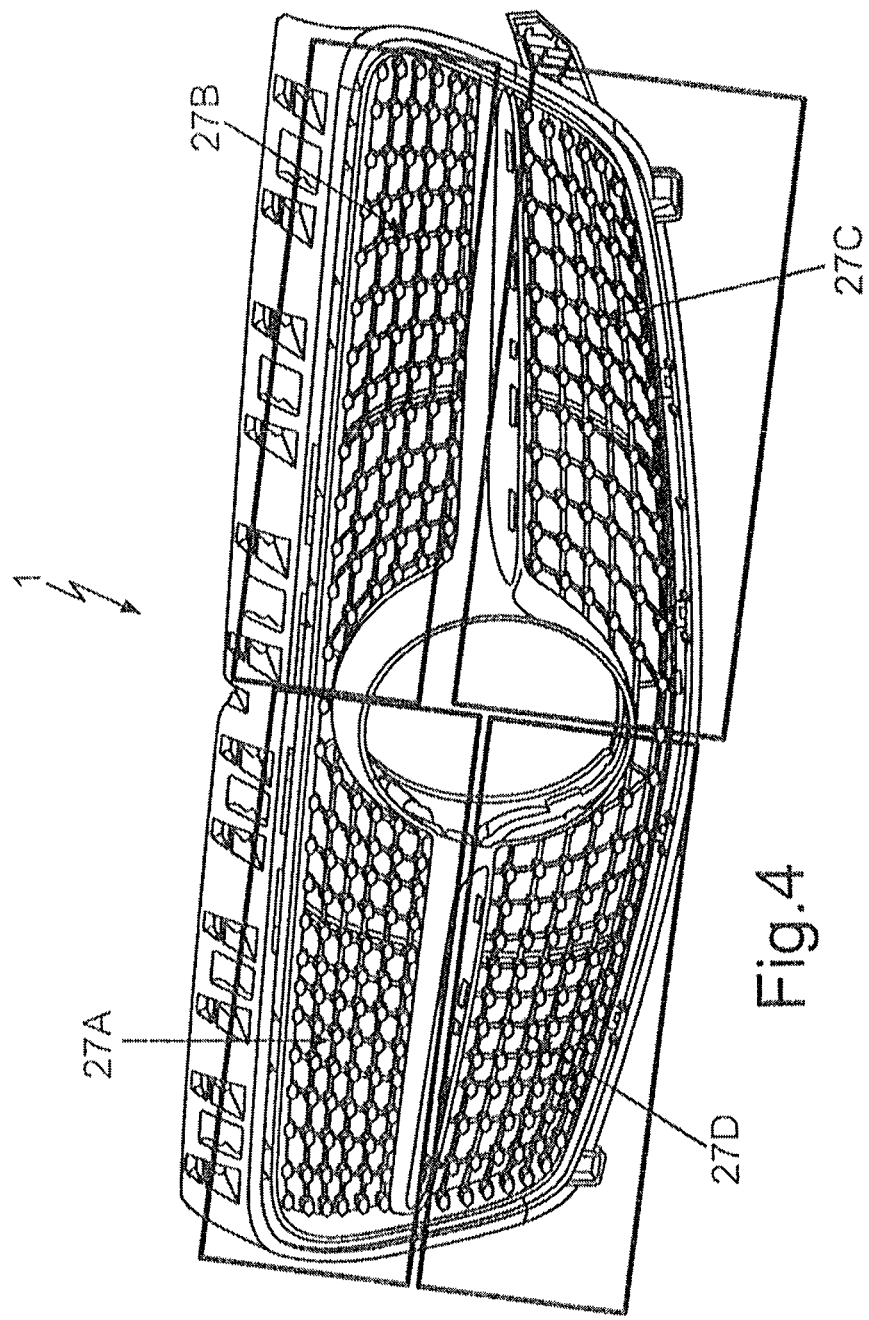

| | | | |
|---|---|---|---|
| 8,157,303 B2 * | 4/2012 | Fortin | B60R 19/18 293/115 |
| 2003/0042055 A1 | 3/2003 | Suwa et al. | |
| 2005/0046205 A1 | 3/2005 | Tanaka | |
| 2010/0148525 A1 | 6/2010 | Abdelnour et al. | |

FOREIGN PATENT DOCUMENTS

| | | |
|---|---|---|
| DE | 24 41 659 A1 | 3/1976 |
| DE | 103 06 158 A1 | 8/2004 |
| FR | 1 019 798 A | 1/1953 |
| JP | 10-226289 A | 8/1998 |
| JP | 2001-163124 A | 6/2001 |
| JP | 2002-52998 A | 2/2002 |
| JP | D1402614 | 12/2010 |

OTHER PUBLICATIONS

German-language Written Opinion dated Sep. 19, 2013 (PCT/ISA/237) (six (6) pages).

Japanese Office Action issued in counterpart Japanese Application No. 2014-559117 dated Jul. 21, 2015, with partial English translation (Five (5) pages).

Japanese Office Action issued in counterpart Japanese Application No. 2014-559117 dated Mar. 15, 2016 with partial English-language translation (four (4) pages).

Chinese Office Action issued in counterpart Chinese Application No. 201380012135.3 dated Apr. 1, 2016 with English-language translation (nine (9) pages).

* cited by examiner

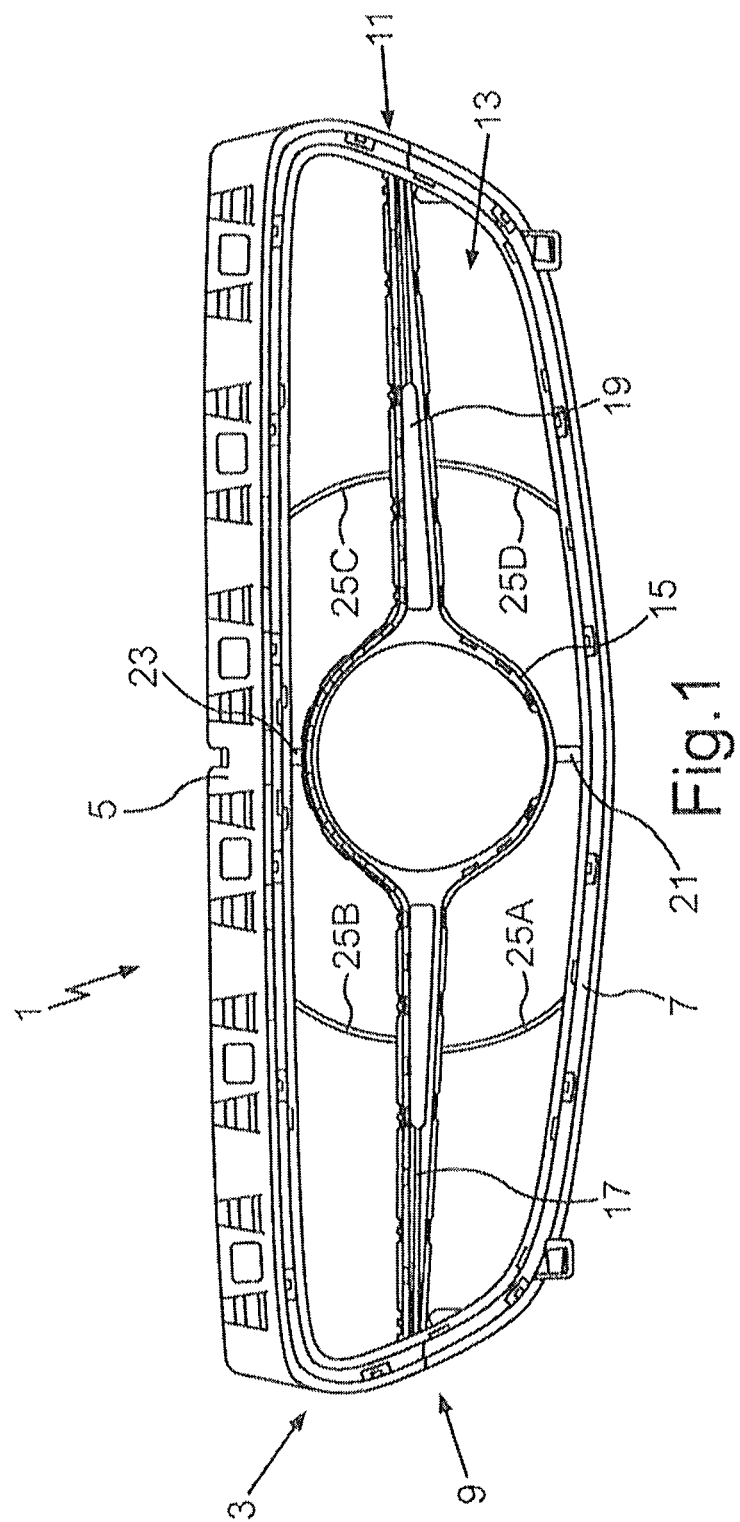

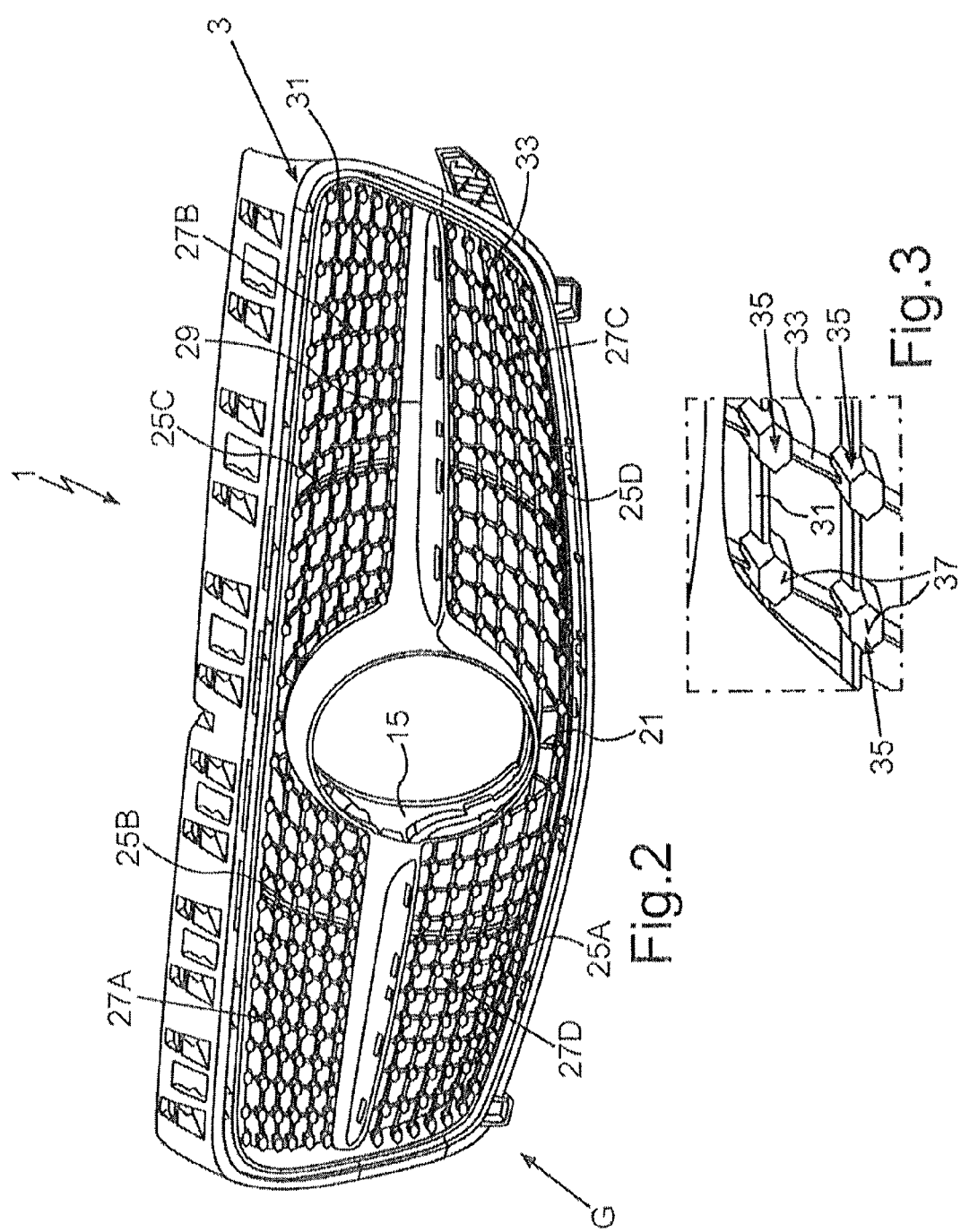

RADIATOR GRILLE FOR A MOTOR VEHICLE

BACKGROUND AND SUMMARY OF THE INVENTION

Exemplary embodiments of the invention relate to an ornamental grille for a motor vehicle and a radiator grille for a motor vehicle.

Such a radiator grille, which is to be attached in the front region of the motor vehicle and is to enable through-flow of air to a component arranged behind it, for example a cooling module or suchlike, has an impact on the optical impression of the motor vehicle due to its arrangement that can be seen from the outside.

German patent document DE 103 06 158 A1 discloses a radiator grille that comprises two respective peripheral frames arranged alongside each other, with the framework elements of which a respective free space is delineated. A respective grille field or grille element is introduced into both free spaces, the element being applied to the corresponding peripheral frame. However, even in the case of larger grille fields, the problem arises in this configuration of the grille element that, when there is a crash, substantial repair work is required with corresponding costs. Moreover, in the known configuration, larger grille fields are highly cost-intensive to produce. Each of the two ornamental grilles introduced into the respective frame has a grille structure having respective intersecting grille elements. Here, however, it is difficult to connect the individual grille elements to one another in a stable manner, in order to achieve a stable ornamental grille overall. Moreover, for specific vehicles, a fluidic optimization requirement can arise.

Exemplary embodiments of the present invention are directed to an ornamental grille and a radiator grille of the aforementioned type, which are optimized with respect to crash incidents and fluidic aspects.

In order to create an ornamental grille of the aforementioned type, which is optimized with respect to a crash incident and fluidic aspects, according to the invention the ornamental grille comprises a grille structure having respective grille elements, wherein domes are formed at the points of intersection of the grille elements. These domes not only enable a stiffer and more stable connection of the individual grille elements to their respective points of intersection and thus, as a consequence, an ornamental grille that is overall more stable if there is a crash, but there also arise fluidic advantages. With a suitable design of the domes, the amount of air, for example, flowing through the ornamental grille can be adjusted and the overall aerodynamics of the motor vehicle can be influenced. Moreover, with the domes, it is possible to increase the perception of value of the ornamental grille.

In this context, one embodiment of the invention has proved to be particularly expedient, in which the domes protrude frontally from the grille elements of the grille structure. The fluidic advantages and perception of value of the ornamental grille are hereby particularly significant.

In addition, it is advantageous if the domes have a front face that is high-gloss polished and/or has a coating added to it. This provides not only a long-lasting, high-quality surface of the domes, but also a particularly high overall perception of value of the ornamental grille.

Exemplary embodiments of the present invention are also recited to a radiator grille that is optimized with respect to a crash incident has a peripheral frame, with the framework elements of which a free space is delineated, into which a grille field having a plurality of ornamental grilles is introduced. Several ornamental grilles can be to be applied to the frame, the grilles covering the free space. This multi-part embodiment of the grille field provides the advantage that, when there is a crash, only the ornamental grille that has been damaged has to be exchanged. The repair costs can thus be reduced.

In one advantageous embodiment of the radiator grille respective ornamental grilles are connected to one another via corresponding connection points. For example, at these connection points, a connecting element of the respective one ornamental grille and a counterpart of the respective other ornamental grille are connected to each other positively and/or with friction fit. There hereby arises a fastening of the ornamental grille not only on the peripheral frame, but also underneath one another.

A further embodiment of the radiator grille has a plurality of struts running within the free space, which are connected to the peripheral frame. This provides a reinforcement of the framework construction of the peripheral frame and thus improved stability in case of a crash.

A further advantageous embodiment of the radiator grille includes at least one ornamental element, with which connection points of the ornamental grille can be covered on the frame and/or beneath one another. The ornamental elements may additionally increase the perception of value of the radiator grille.

A further advantageous embodiment provides that the ornamental grille can be assembled from the front. Thus, in the installed state of the radiator grille, the disassembly of a single ornamental grille is possible in a simple manner.

BRIEF DESCRIPTION OF THE DRAWING FIGURES

Figure 5:
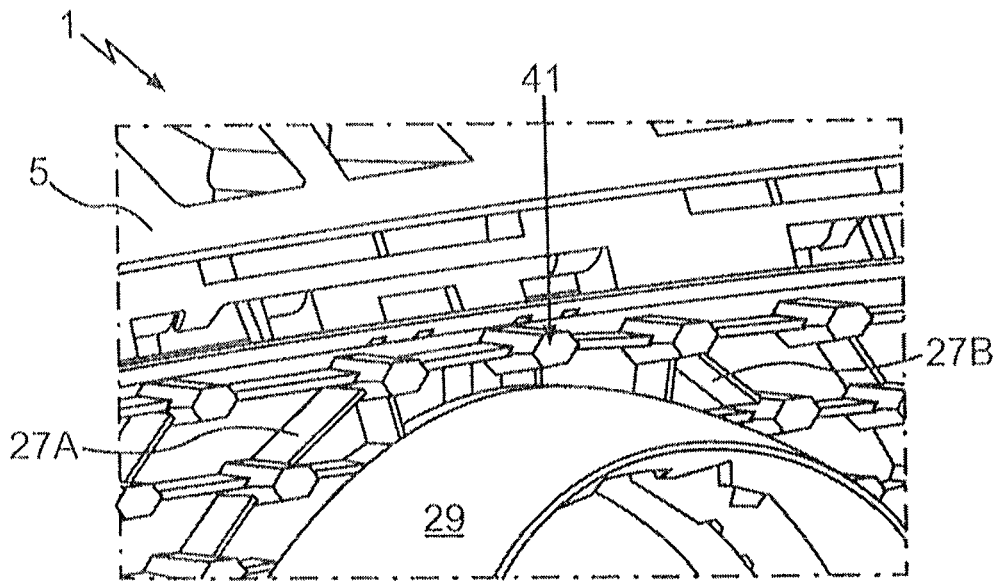
Figure 6:
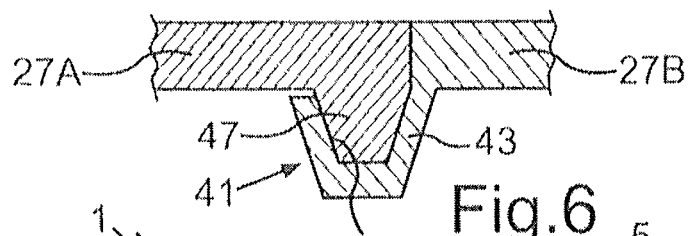
Figure 7:
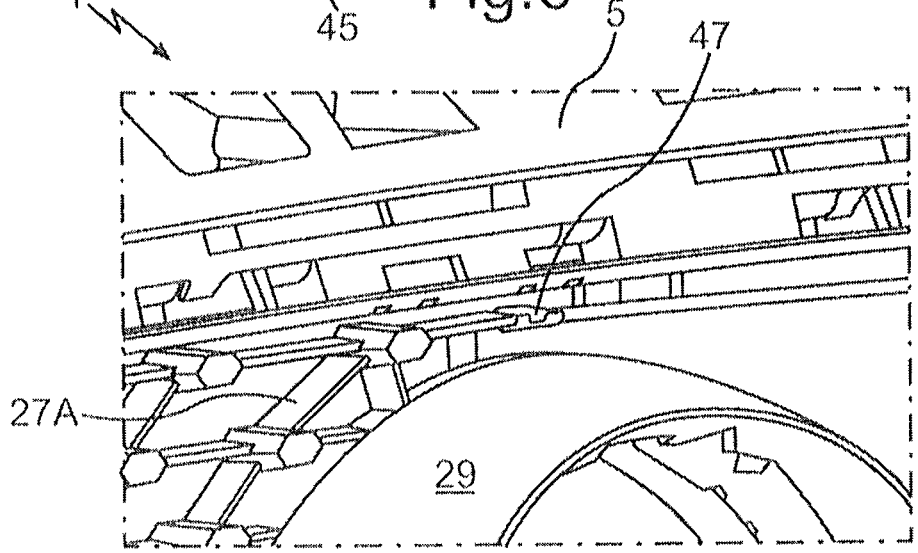

Further advantages and details of the invention arise from the description of a preferred exemplary embodiment below, as well as with the aid of the figure. Here are shown:

FIG. 1 a front view of a component that is generally known as a radiator grille, which is to be arranged in the front region of a motor vehicle and has a peripheral frame, with the framework elements of which a free space is delineated;

FIG. 2 a perspective front view of the radiator grille according to FIG. 1, to the frame of which four flat ornamental grilles are attached;

FIG. 3 an enlarged depiction of a section of the radiator grille according to FIG. 2 in a perspective front view;

FIG. 4 a perspective front view of the radiator grille, analogously to FIG. 2;

FIG. 5 a slightly perspective front view of a section of the radiator grille according to FIG. 2;

FIG. 6 a horizontal section through a connection point between the ornamental grilles according to FIG. 5, and FIG. 7 a perspective front view of a section of the radiator grille, analogously to FIG. 5.

DETAILED DESCRIPTION

FIG. 1 shows, in a front view, a component that is generally known as a radiator grille 1, which is to be arranged in the front region of a motor vehicle. The radiator grille 1 has a peripheral frame 3, comprising, in the state where it is applied to the motor vehicle, an upper strip-like framework element 5 that runs at least fundamentally horizontally, a lower strip-like framework element 7 running at least fundamentally horizontally and thus parallel to the framework element 5, as well as two lateral framework elements 9 and 11, which connect the two upper framework elements 5, 7 to each other. The peripheral frame 3 formed hereby represents the basis for the radiator grille 1. The frame is produced, for example, from a plastic.

In the free space 13 that is delineated between the framework elements 5 to 11, a fundamentally centrally arranged annular element 15 is provided, which preferably serves to receive an emblem that is not depicted here. The annular element 15 is connected to the frame 3 via horizontally-running struts 17 and 19, as well as vertically-running struts 21 and 23. The annular element 15 is reinforced by the horizontally and vertically-running struts 17 to 23. Furthermore, in this exemplary embodiment, curved supplementary struts 25A to 25D are provided, which serve for the additional reinforcement of the above-described framework construction. The supplementary struts 25A and 25B are arranged fundamentally above each other and are attached with a offset to each other to the horizontal frame strut 17 and to the upper framework element 5 or to the lower framework element 7. The same applies for the supplementary struts 25C and 25D.

The radiator grille 1 according to the invention, in particular the framework construction described above, with a suitable material selection, leads to a high level of rigidity of the individual part, i.e. the frame 3. Ornamental elements that are fastened thereupon or thereto may therefore have a very low level of rigidity, since they do not have to contribute to the rigidity of the radiator grille, or at least make no substantial contribution to it. The rigid frame 3 leads to a higher level of dimensional stability in the bumper assembly compared to conventional, extensive ornamental grilles/radiator grilles, which, due to their geometry, have a negative influence on the rigidity of the entire bumper composite.

The frame 3 can fundamentally be designed integrally or, alternatively, can be assembled from several separate parts.

FIG. 2 shows the radiator grille 1 according to FIG. 1 in a slightly perspective front view, to the frame 3 of which a total of four flat grille elements or ornamental grilles 27A to 27D are attached here, which are part of the radiator grille 1. Together, the ornamental grilles 27A to 27D form an at least optically integral grille field G, which completely fills or covers the free space 13 that remains alongside the annular element 15 and the struts 17 to 23. The ornamental grilles 27A to 27D are, in a suitable manner, connected to the frame 3—preferably in a non-destructive, releasable manner—for example clipped, locked or the like.

As illustrated in FIG. 1, the frame 3, in particular the framework elements 5 to 11, have a number of openings, with which corresponding latching means on the ornamental grilles 27A to 27D may be brought into active engagement. In addition, the annular element 15 and the struts 17 and 19 that hold it in a defined position in the free space 13 may also have latch openings added to them for the production of a latching connection between the ornamental grilles and the frame.

Furthermore, in FIG. 2, an ornamental element 29 that is designed purely by way of example as a single-piece component is attached, which covers the horizontal framework elements 17 and 19 as well as the annular element 15 arranged between these.

The ornamental grilles 27A to 27D are preferably each designed as a single part. The respective grille structure forms the background of the ornamental grilles 27A to 27D. For this, the points of intersection between the horizontally running grille elements 31 and the vertically running grille elements 33 each have protrusive domes 35 added to them, i.e. domes that protrude frontally in the direction of the vehicle exterior, as can be seen in particular in FIG. 3, which shows a section of the radiator grille 1 according to FIG. 2 in an enlarged depiction.

The domes 35 have a flat side/front face 37 that is fundamentally six-sided here, which protrudes from the grille elements 31 running fundamentally in the vertical direction and from the grille elements 33 running fundamentally in the horizontal direction. The points of intersection/domes 35 may have a coating added to them for optical emphasis on the front side, so in the region of its front/visible surface or its flat side/front face 37, for example high-gloss polished and/or, if necessary, by means of hot embossing technology or back injection. A coating could, for example, be designed to be of a single color, multicolor or metallic. For example, the flat sides/front faces 37 can hereby be emphasized with a chrome or metallic finish, or even in the vehicle color. A corresponding surface structuring can also be provided, for example a grained structure.

Due to the optical alteration of the domes 35 by corresponding coating or suchlike, as well as the protruding arrangement thereof from the grille elements 31, 33, the perception of value of a vehicle can be increased. Due to the domes 35 protruding from the ornamental grilles 27A to 27D, a so-called pin optic is implemented, i.e. the points of intersection/nodal points also protrude optically from the grille elements 31 and 33 in the form of punctiform elements.

The grille elements 31 and 33 may generally be formed as air guidance elements, similar to ribs, in such a way that the air flowing through the ornamental grille while the motor vehicle is driving is diverted in a defined manner and/or the air speed is influenced. For example, an assembly arranged, as seen in the direction of flow, behind the ornamental grilles can hereby be charged in a targeted manner with a larger volume of cooling air than would be the case if there were grille elements optimized for flow resistance according to an alternative embodiment of the invention.

FIG. 4 differs from FIG. 2 only in that the division of the ornamental grilles 27A to 27D is indicated. According to this, the ornamental grille 27A is located in the first quadrant; the ornamental grille 27B is located in the second quadrant, the ornamental grille 27C is located in the third quadrant and the ornamental grille 27D is located in the fourth quadrant. Together, the ornamental grilles 27A to 27D form an at least optically integral grille field G.

In the state applied in the frame 3, the ornamental grilles 27A to 27D give the observer the impression that it is a single, extensive ornamental grille, wherein the centrally arranged annular element 15 virtually divides this for the reception of an emblem that is not depicted here. The four individual parts, so the ornamental grilles 27A to 27D, have the advantage compared to an integral, extensive ornamental grille that they have less interleaving. These may thus be decorated in a simple process, for example by hot embossing.

The fastening of the ornamental grilles 27A to 27D to the frame 3 is illustrated in greater detail with the aid of FIGS. 5 to 7.

As can be seen from FIGS. 5 and 7, which each display a section of the radiator grille 1 with a viewing direction towards its visible side from the front, the ornamental grilles 27A to 27D are applied from the front side to the frame 3 and are fastened thereto. For this, first both ornamental grilles 27A and 27D, then the ornamental grilles 27B and 27C and, only after this, the cover element/ornamental element 29 are applied, and are connected to the frame and, if necessary, to one another.

Provision is made for the connection point 41 between the ornamental grilles 27A and 27B and the connection point 41 between the ornamental grilles 27C and 27B to not be visible from the front. Therefore, respective connecting pins are provided on the connection points 41 between the upper and lower ornamental grilles 27A and 27B or 27C and 27D, which are preferably designed as latching or other connection elements.

As can be seen from FIG. 6, which shows a horizontal section through the connection point 41 between the ornamental grilles 27A and 27B according to FIG. 5, the connecting element 43 provided on the ornamental grille 27B has a receiver 45, into which the counterpart 47 provided on the ornamental element 27A, which is here formed by a positive fit element that is adapted accordingly to the receiver, is inserted and is potentially locked, adhered or welded hereto. The connection point 41 is designed in such a way that the interface/connection point 41 is not detectable for an observer or is at least not readily detectable.

Due to the ornamental element 29, it is possible to be able to cover respective connection points of the ornamental grille 27A to 27D on the frame 3 and/or beneath one another.

It is important that the assembly of the ornamental grilles 27A to 27D take place from the front, such that, even in the installed state of the radiator grille 1, the disassembly of a single ornamental grille 27A to 27D is possible in a simple manner, for example in an exchange.

In summary, the ornamental grilles according to the invention, which have domes added to them on points of intersection of their grille elements forming a grille structure, have greater stability compared to known ornamental grilles and also provide fluidic advantages in corresponding designs. For example, the aerodynamics of the motor vehicle can hereby be influenced overall. Nodes or nodal points are formed virtually on the points of intersection of the grille elements by means of the domes, which lends a higher level of stability to the entire structure of the respective, preferably integral, ornamental grille.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An ornamental grille for a motor vehicle, the ornamental grille comprising:
   a frame,
   a grille structure having a plurality of grille elements, and an annular element, and
   wherein domes are formed on and enclose points of intersection of the grille elements of the grille structure,
   wherein the ornamental grille is configured for attachment to the frame of a radiator grille of the motor vehicle,
   wherein the domes are integrally formed with the grille elements and provide increased stiffness and stability between the grille elements and the respective points of intersection, and
   wherein the annular element is connected to the frame via one or more of: (i) a horizontally-running strut and (ii) a vertically-running strut.

2. The ornamental grille of claim 1, wherein the domes protrude frontally from the plurality of grille elements of the grille structure.

3. The ornamental grille of claim 2, wherein the domes have a front face that is high-gloss polished or is coated.

4. The ornamental grille of claim 2, wherein the domes have a six-sided front face.

5. The ornamental grille of claim 2, the protrusion of the domes from the grille structure is such that the grille structure forms a background of the ornamental grille.

6. A radiator grille for a motor vehicle, comprising:
   a peripheral frame comprising a plurality of framework elements, wherein the plurality of framework elements delineate a free space; and
   a grille field arranged in the free space, wherein the grille field comprises: a grille structure having a plurality of grille elements, wherein domes are formed on and enclose points of intersection of the grille elements of the grille structure,
   wherein the ornamental grille is attached to the peripheral frame, and wherein the domes are integrally formed with the grille elements and provide increased stiffness and stability between the grille elements and the respective points of intersection, and
   wherein the free space has an annular element and the annular element is connected to the peripheral frame via one or more of: (i) a horizontally-running strut and (ii) a vertically-running strut.

7. The radiator grille of claim 6, wherein the plurality of ornamental grilles are connected to one another via corresponding connection points.

8. The radiator grille of claim 6, wherein a connecting element of one of the plurality of ornamental grilles and a counterpart of another one of the plurality of ornamental grilles are connected to one another in a positive or friction-fit manner.

9. The radiator grille of claim 6, wherein a plurality of struts running within the free space are connected to the peripheral frame.

10. The radiator grille of claim 6, wherein at least one ornamental element is connected to the peripheral frame.

11. The radiator grille of claim 6, wherein the ornamental grille is configured for assembly from a front of the radiator grille.

12. A radiator grille for a motor vehicle, comprising:
    a peripheral frame comprising a plurality of framework elements, wherein the plurality of framework elements delineate a free space; and
    a grille field arranged in the free space, wherein the grille field comprises:
       a grille structure having a plurality of grille elements, wherein domes are formed on and enclose points of intersection of the grille elements of the grille structure,
       wherein the ornamental grille is attached to the peripheral frame,
       wherein a connecting element of one of the plurality of grille elements is integrally formed with the one of the plurality of grille elements and is connected in a positive or friction-fit manner to a counterpart element of another one of the plurality of grille elements, the counterpart element being integrally formed with the other one of the plurality of grille elements, and
       wherein the connecting element has a receiver and the receiver accommodates the counterpart element in the positive or the friction-fit manner, and wherein the free space has an annular element and the annular element is connected to the peripheral frame via one or more of: (i) a horizontally-running strut and (ii) a vertically-running strut.

* * * * *